Patented Nov. 23, 1948

2,454,435

UNITED STATES PATENT OFFICE 2,454,435

PROCESS FOR BREAKING PETROLEUM EMULSIONS

Melvin De Groote, University City, and Owen H. Pettingill, Kirkwood, Mo., assignors to Petrolite Corporation, Ltd., Wilmington, Del., a corporation of Delaware No Drawing. Application March 12, 1947, Serial No. 734,212

9 Claims. (Cl. 252—331)

This invention relates to the resolution of petroleum emulsions.

The main object of our invention is to provide a novel process for resolving petroleum emulsions of the water-in-oil-type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

Cashew nut shells can be solvent extracted to yield a liquid sometimes referred to as "cashew nutshell liquid." Such product is not an article of commerce and, presumably, would be better designated as untreated cashew nutshell liquid. Reference in commerce to cashew nutshell liquid invariably refers to the product obtained by distillation of the cashew nutshells in which pyrolysis is involved. Such pyrolysis, among other things, eliminates the carboxyl radical of the untreated cashew nutshell liquid.

The herein described new chemical products, compounds, or compositions of matter which are used as the demulsifying agent in our process consist of drastically oxidized (treated, i. e., pyrolyzed) cashew nutshell liquid and the oxyalkylated derivatives thereof. It is believed that treated cashew nutshell liquid consists principally of pentadecenylphenol (dihydroanacardol) and lesser amounts of pentadecadienylphenol (anacardol). The raw materials employed in the present invention are prepared from the phenolic compositions present in or derived from the oils extracted from the anacardium genus of the anacardiaceae family. Untreated cashew nutshell liquid is described as consisting of about 90% of anacardic acid $C_{22}H_{32}O_3$ and about 10% of cardol, $C_{32}H_{52}O_4$, with very small fractional percentages of ether materials. The generally accepted formula of anacardic acid is

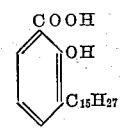

As previously stated, pyrolytic distillation causes conversion into phenols. As to further information regarding cashew nutshell liquid and its phenolic derivatives, see J. A. C. S., volume 68, No. 2, p. 345.

It is well known that when certain fatty acids and particularly their glycerides are subjected to drastic oxidation with a gaseous oxygenating medium such as air, certain complicated changes take place, which are obscure and not readily susceptible to complete explanation. Examples of oils subjected to oxidation and commonly marketed as blown oil, are particularly castor oil and also soyabean oil.

Thus, it is well known that oxidized oils can be obtained from castor oil, ricinoleic acid, and various derivatives of ricinoleic acid, such as monoricinolein, diricinolein and polyricinoleic acids. They are produced by the common practice of blowing or oxidizing castor oil and similar fatty oils or acids, particularly non-drying, unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc., or it may be of the organic type, which produces peroxide, such as alpha-pinene, linseed oil, etc. Oxidation may take place at atmospheric pressure or superatmospheric pressure, i. e., pressures up to or including 200 pounds gauge pressure, and at any temperature slightly above the boiling point of water, for instance, 120° C., up to any temperature which does not produce undue decomposition by pyrolytic reaction.

The time of blowing may be fairly brief, for example, 8–10 hours; or it may be quite extensive, for instance, as long as 10–12–14 days, the longer time periods being employed generally when the temperature is just slightly above the boiling point of water, and when oxidation is with air at atmospheric pressure.

One method of preparing drastically-oxidized castor oil is described in U. S. Patent No. 2,023,979, dated December 10, 1935, to Stehr. Also see U. S. Patent No. 2,183,437, dated December 12, 1939, to Colbeth.

Oddly enough, phenolic materials are frequently used as inhibitors to prevent deterioration by oxidation. A phenolic group seems to be an effective inhibitor of oxidation. Notwithstanding this fact, we have found that the same conventional procedure or procedures employed for the oxidation of castor oil or similar compounds is equally suitable for the blowing or oxidation of treated cashew nutshell liquid, or its two principal constituents, to wit, pentadecenylphenol or pentadecadienylphenol. In most instances, the period and conditions of oxidation are apt to be approximately the same as castor oil. For instance, we have been able to drastically-oxidize treated cashew nutshell liquid in approximately a week's time, using a temperature of 110–120° C. If a catalyst is employed, the period can be shortened. This is also true if a higher temperature is used or a higher pressure employed. Our preference, however, is to use mild conditions of oxidation which would, for example, require about a week or ten days for the oxidation of castor oil. As stated, the period of oxidation can be shortened or speeded up in the same way that the oxidation of castor oil can be shortened or accelerated. As is previously pointed out, cashew nutshell liquid of commerce and, in fact, the only one ordinarily obtainable, is that which has been treated, i. e., pyrolyzed. For convenience of terminology and particularly in that the terminology herein employed conforms to that of commerce, subsequent reference to cashew nutshell liquid means the product obtained by distillation involving pyrolysis and is the treated material. For purpose of specificity, however, the word "treated" has been included in the claims.

Regardless of the method employed, it is our preference to oxidize just short of the point where the reacting mass would convert into insoluble or rubbery materials. Thus, while the initial reactants are comparatively thin and show a viscosity of that of ordinary oils, the finished product shows a viscosity of that of blown castor oil and also perhaps an incipient tendency towards stringiness. If the reaction is conducted too far, the material may go to an insoluble mass, or may simply cause lumps or a semi-rubbery state, which is not particularly suitable, and which, as a matter of fact, tends to resist solution in the common solvents, which are suitable for resolving drastically-oxidized cashew nutshell liquid and the like. Briefly, in any operation involving the gaseous oxidation of cashew nutshell liquid or pentadecenylphenol or pentadecadienylphenol, all that is required is that the operation be conducted to the point just short of the rubbery or insoluble stringy state. Needless to say, one can conduct the operation for a shorter period of time so as to produce significant changes of the kind herein described, but need not be as completely oxidized as previously indicated. This again, is comparable to the oxidation of castor oil, insofar that blown castor oil is ordinarly offered in three grades, to wit, light blown, medium blown, and heavily blown.

An additional index and a means for measuring the degree of oxidation along with increase in viscosity, etc., is the fact that as oxidation takes place, there is a definite development of an acid number or saponification number. There is also a change in the iodine number and in the hydroxl number. The following table gives the values in respect to the unoxidized cashew nutshell liquid and a sample of drastically-oxidized cashew nutshell liquid. Note that oxidation increases acidity.

| | Cashew Nutshell Liquid | Blown Cashew Nutshell Liquid |
|---|---|---|
| Acid value | 11.2 | 27.0 |
| Saponification value | 11.6 | 27.4 |
| Hydroxyl value | 196.0 | 177.6 |
| Iodine (Wijs) | 202.2 | 201.0 |

Gaseous oxidation of cashew nutshell liquid causes an increase in viscosity along with darkening of color. The iodine value appears to be of little significance and varies with the size of the sample. The significance of the changes introduced by drastic oxidation, as described, are indicated by the increase in acid or saponification value, as well as the decrease in the hydroxyl value, and change in viscosity. The color may also change to a deep amber on even black.

It is well known that the exact composition of ordinary oxidized castor oil is not known. This has been a matter of comment from time to time, in the literature, including the patent literature dealing with arts in which blown castor oil is contemplated. Obviously, even less is known in regard to the change which takes place during the drastic oxidation of cashew nutshell liquid and its components.

As has been previously pointed out, the same conventional procedure or processes employed for the oxidation of castor oil or similar compounds is equally suitable for the blowing or oxidation of cashew nutshell liquid. This applies to the ordinary product of commerce, or the product obtained by more careful distillation or re-distillation so as to give a product free from certain non-phenolic co-geners. The values above given for blown cashew nutshell liquid, represent a product which was blown for 168 hours at 120° C. with ordinary air, carrying usual climatic moisture. No catalyst was added. If desired, the same degree of oxidation can be accomplished at 110° C. if one increases the time to 220 hours. The above product would represent medium oxidation. If desired, a lightly oxidized oil could be obtained by limiting the oxidation period to approximately 90% of that previously indicated, that is, 90% of 168 hours at 120° C. Similarly, a heavily oxidized oil can be obtained by increasing the time of oxidation approximately 5% to 10%, or in any other suitable manner, such as increasing the temperature slightly, or using a catalyst. Certain oxidation catalysts have been previously mentioned in connection with derivatives of castor oil and these can also be used in connection with the blowing of cashew nutshell liquid. Hereafter, reference to these three types will be employed and they will be indicated as cashew nutshell liquid light blown, cashew nutshell liquid medium blown, and cashew nutshell liquid heavily blown. The latter product is characterized by incipient stringiness or sem-rubberiness, but is still susceptible to oxyalkylation, particularly oxethylation, so as to yield a water-soluble or water-emulsifiable product. The color of the blown product was deep amber or almost black.

Having obtained a drastically-oxidized cashew nutshell liquid or drastically-oxidized pentadecenylphenol, or drastically-oxidized pentadecadienylphenol, such intermediate is treated with an oxyalkylating agent, preferably ethylene oxide, propylene oxide, butylene oxide, glycidol, methylglycidol, or the like.

It is well know that phenols and carboxy acids can be subjected to oxyalkylation so as to yield products which have enhanced hydrophile properties, and may be oxyalkylated, if desired, under appropriate conditions to give completely water-soluble products. As to patents which describe the oxyalkylation of carboxy acids or phenols, see U. S. Patent No. 1,826,900, dated October 13, 1931, to Schrader; and British Patent No. 470,181, to Wilfred Wm. Groves.

Thus, the conventional oxyalkylating procedure is well known, and generally speaking, involves nothing more nor less than heating a fatty acid, for instance, oleic or stearic acid, or a phenol, such as any of the ordinary phenols, in the presence of successive small amounts of an alkylene oxide, or the like, under comparatively low pressures and fairly low temperatures, and usually in the presence of an alkaline catalyst, as, for example, sodium oleate, caustic soda, sodium carbonate, sodium methylate, etc. The temperatures employed are above 100° C. and below 200° C. The pressures employed are generally above 100 pounds gauge pressure, and below 300 pounds gauge pressure. Sometimes oxyalkylation is conducted in a continuous manner by the introduction of ethylene oxide in a gaseous state. More frequently and most conveniently, the oxide is introduced in liquid form in comparatively small amounts, for instance, 200 pounds of the material to be oxyethylated, such as drastically-oxidized cashew nutshell liquid and 30 pounds of ethylene oxide along with approximately a pound of sodium methylate. In such instances, where the drastically-oxidized cashew nutshew liquid is prepared for oxyalkylation, and particularly oxyethylation, we prefer to add a small amount of alkali at the completion of the oxidation stage, so that it can be converted into a soap or phenolate, and thus serve as a catalyst. For instance, we prefer to add approximately ½% of caustic soda or caustic potash to the drastically-oxidized cashew nutshell liquid and heat to 120° C. long enough to drive off the water used to dissolve the alkali or resulting from the neutralization reaction. The oxyethylation reaction is allowed to take place under pressure in the manner above described, until all the ethylene oxide or other alkylene oxide is absorbed. Another portion of ethylene oxide is added and the procedure repeated until the desired stage of hydrophile character is obtained. Initial hydrophile character is indicated by the fact that the product shows self-emulsifiability in water. Complete or maximum hydrophile character is shown when the product will dissolve in water to give a clear solution, and in fact, will form a clear solution even in the presence of modest amounts of a water-insoluble solvent, such as 10 to 15% of xylene.

Theoretically, the alkylene oxide can combine with the phenolic hydroxyl radical with any carboxyl radical, and probably with hydroxyl radicals which have come into existence in the aliphatic chain, as a result of the oxidation reaction. Thus, as is illustrated by the example previously noted, one can add the hydroxyl value to the carboxyl value and assume that this represents an approximate equivalent of the amount of alkylene oxide required in mono molar proportions. Our preference is to introduce anything from three to twenty of such molar proportions for each mole of phenol. Stated another way, our preference is to treat one pound of the drastically-oxidized cashew nutshell liquid or its equivalent with one to five pounds of the oxyalkylating agent. Our preference is to use ethylene oxide, primarily due to its cost and its greater reactivity. More propylene oxide or butylene oxide would be required than ethylene oxide to give the same hydrophile effect and materials. Less glycide is required than propylene oxide, and less methylglycide than butylene oxide. We have found, however, that regardless of which alkylene oxide is employed, as soon as a stage is reached varying from initial self-emulsifiability, up to and including a state of extremely hydrophile character, products are obtained of distinct and outstanding value for various uses and particularly for demulsification.

OXYALKYLATED BLOWN CASHEW NUTSHELL LIQUID

*Example 1*

For convenience, the molecular weight of the oxidized or blown product is considered as the same as the original product; one pound mole of such blown cashew nutshell liquid (medium blown grade) is mixed with one-half of 1% of sodium methylate and subjected to reaction with two pound moles of ethylene oxide at a temperature between 125 and 175° C. and a pressure between 125 pounds per square inch to 145 pounds per square inch. The time required for such reaction is approximately 3–6 hours. The color was thinner, and more of a pale amber than in the case of the initial product prior to oxyalkylation, and exhibits little or no hydrophile properties in dilute aqueous solution.

OXYALKYLATED BLOWN CASHEW NUTSHELL LIQUID

*Example 2*

The same procedure is employed as in "Oxyalkylated blown cashew nutshell liquid, Example 1," except that four moles of ethylene oxide are employed instead of two moles, and the resultant shows some degree of water-solubility, having a milky appearance in a dilute aqueous solution.

OXYALKYLATED BLOWN CASHEW NUTSHELL LIQUID

*Example 3*

The same procedure is employed as in "Oxyalkylated blown cashew nutshell liquid, Example 1," except that six moles of ethylene oxide are employed instead of two moles, and the hydrophile properties have increased to the extent that a dilute aqueous solution will foam, although still having a milky appearance.

OXYALKYLATED BLOWN CASHEW NUTSHELL LIQUID

*Example 4*

The same procedure is employed as in "Oxyalkylated blown cashew nutshell liquid, Example 1," except that eight moles of ethylene oxide are employed instead of two moles. The product was amber in color, and entirely hydrophile, giving a clear dilute aqueous solution.

OXYALKYLATED BLOWN CASHEW NUTSHELL LIQUID

*Example 5*

The same procedure is employed as in the four examples preceding, except that propylene oxide or methyl glycidol is employed instead of ethylene oxide.

Oxyalkylated Blown Cashew Nutshell Liquid

Example 6

The same procedure is employed as in the 5 preceding examples, except that instead of employing a medium blown cashew nutshell liquid, one employs either a light blown or heavily blown cashew nutshell liquid.

We again wish to emphasize that our invention, in its broadest aspects, contemplates (1st) Blown cashew nutshell liquid and oxyalkylated blown cashew nutshell liquid;

(2nd) A method of making both of these two compositions; and (3rd) The use of both of said compositions in various arts, including particularly breaking of oil field emulsions; and use as break inducers in doctor treatment, etc.

We desire to emphasize that in the hereto appended claims reference to the product being drastically-oxidized means oxidation by means of a gaseous oxygen-containing medium, such as air, dry or moist, ozone, ozonized air, oxygen, etc. The alkylene oxide employed is one having not more than 4 carbon atoms, and we particularly prefer to employ ethylene oxide. Although our invention has a dual aspect, we attach the greater and most important significance to the oxyalkylated derivatives, the method of manufacturing same, and their uses. What is said hereinafter as to the utility of these products, applies particularly to the oxyalkylated derivatives.

Conventional demulsifying agents employed in the treatment of oil field emulsions are used as such, or after dilution with any suitable solvent, such as water; petroleum hydrocarbons, such as benzene, toluene, xylene, tar acid oil, cresol, anthracene oil, etc. Alcohols, particular aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our herein described process for resolving petroleum emulsions, may be admixed with one or more of the solvents customarily used in connection with conventional demulsifying agents. Moreover, said material or materials may be used alone or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, 1 to 20,000, or even 1 to 30,000, or 1 to 40,000, or 1 to 50,000 in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of the new chemical product or compound herein described, is in the removal of a residual mud sheath which remains after drilling a well by the rotary method. Sometimes the drilling mud contains added calcium carbonate or the like to render the mud susceptible to reaction with hydrochloric acid or the like, and thus expedite its removal.

One preferred and more narrow aspect of our invention insofar as it is concerned with demulsification of petroleum emulsions of the water-in-oil type, is concerned with the admixture of the new demulsifier herein described with a viscosity-reducing solvent such as the various solvents enumerated, particularly aromatic solvent, alcohols, ether alcohols, etc., as previously specified. The word "solvent" is used in this sense to refer to the mixture if more than one solvent is employed, and generally speaking, it is our preference to employ the demulsifier in a form representing 25% to 85% demulsifier and 15% to 75% solvent, largely, if not entirely, non-aqueous and so selected as to give a solution or mixture particularly adaptable for proportional pumps or other measuring devices.

Attention is directed to the following fact: The herein described new chemical materials or products contain hydroxyl groups. The hydroxyl groups may be present as a result of terminal groups obtained by oxyalkylation, or may be present as part of original phenolic radicals, or they may be present in both forms. Obviously, such hydroxyl groups may be reacted further, for instance, with a polycarboxy acid or anhydride such as phthalic anhydride, maleic anhydride, etc., or with alpha-halogenated monocarboxy acids having less than 8 carbon atoms such as chloroacetic acid. Such derivatives, in turn, may be considered as intermediates for further reaction. For instance, the maleic acid derivatives may be reacted with sodium bisulfite to introduce sulfonic groups, or the chloroacetic derivative may be reacted with a tertiary amine, such as dimethyldodecylamine to produce a quaternary compound.

It is understood that when intended to be used as reactants, the upper ratio of oxyalklating agent may well be double that previously referred to when measured in terms of moles added per phenolic radical, or measured in percentage increase in weight, based on the original resin.

In light of the usual knowledge of resin manufacture and insofar that resinification of the kind herein employed to produce a starting material, invariably and inevitably produces a mixture of analogous or related compounds, it is obvious that the subsequent derivatives must likewise invariably and inevitably represent a mixture in contradistinction to a single compound.

As has been previously pointed out, the reaction products of the kind herein described have a resin- to wax-like and fat-like character, and solubility in water may vary from incipient self-emulsifiability to a stage where a product gives a clear solution or sol, even in the presence of a modest amount of water-insoluble solvent, such as 10 to 20% of xylene.

The new chemical products or compounds herein described form the subject-matter of our co-pending application Serial No. 1,483, filed January 9, 1948.

Having thus described our invention, what we claim and desire to secure by Letters Patent is:

1. A process of breaking emulsions of the water-in-oil type, characterized by subjecting the emulsion to the action of a demulsifying agent comprising an oxyalkylated, drastically-oxidized treated cashew nutshell liquid.

2. A process of breaking emulsions of the water-in-oil type, characterized by subjecting the emulsion to the action of a demulsifying agent comprising an oxyalkylated, drastically-oxidized treated cashew nutshell liquid, characterized by the fact that said oxidation is conducted by means of a gaseous oxygen-containing medium.

3. A process of breaking emulsions of the water-in-oil type, characterized by subjecting the emulsion to the action of a demulsifying agent comprising an oxyalkylated, drastically-oxidized treated cashew nutshell liquid, characterized by the fact that said oxidation is conducted by means of a gaseous oxygen-containing medium, and with the proviso that said oxidation is stopped short of the sub-rubbery stage.

4. A process of breaking emulsions of the water-in-oil type, characterized by subjecting the emulsion to the action of a demulsifying agent comprising an oxyethylated, drastically-oxidized treated cashew nutshell liquid.

5. A process of breaking emulsions of the water-in-oil type, characterized by subjecting the emulsion to the action of a demulsifying agent comprising an oxyethylated, drastically-oxidized treated cashew nutshell liquid, characterized by the fact that said oxidation is conducted by means of a gaseous oxygen-containing medium.

6. A process of breaking emulsions of the water-in-oil type, characterized by subjecting the emulsions to the action of a demulsifying agent comprising an oxyethylated, drastically-oxidized treated cashew nutshell liquid, characterized by the fact that said oxidation is conducted by means of a gaseous oxygen-containing medium, and with the proviso that said oxidation is stopped short of the sub-rubbery stage.

7. A process of breaking emulsions of the water-in-oil type, characterized by subjecting the emulsions to the action of a demulsifying agent comprising an oxyethylated, drastically-oxidized treated cashew nutshell liquid; said oxyethylation being sufficient to impart hydrophile properties, at least sufficient to give self-emulsifiability.

8. A process of breaking emulsions of the water-in-oil type, characterized by subjecting the emulsions to the action of a demulsifying agent comprising an oxyethylated, drastically-oxidized treated cashew nutshell liquid, characterized by the fact that said oxidation is conducted by means of a gaseous oxygen-containing medium; said oxyethylation being sufficient to impart hydrophile properties, at least sufficient to give self-emulsifiability.

9. A process of breaking emulsions of the water-in-oil type, characterized by subjecting the emulsions to the action of a demulsifying agent comprising an oxyethylated, drastically-oxidized treated cashew nutshell liquid, characterized by the fact that said oxidation is conducted by means of a gaseous oxygen-containing medium, and with the proviso that said oxidation is stopped short of the sub-rubbery stage; said oxyethylation being sufficient to impart hydrophile properties, at least sufficient to give self-emulsifiability.

MELVIN DE GROOTE.
OWEN H. PETTINGILL.

REFERENCES CITED

The following references are of record in the file of this patent:

UNITED STATES PATENTS

| Number | Name | Date |
| --- | --- | --- |
| 2,075,018 | Bruson et al. | Mar. 30, 1947 |
| 2,278,838 | De Groote et al. | Apr. 7, 1942 |
| 2,307,058 | Moeller | Jan. 5, 1943 |
| 2,317,726 | Boedeker et al. | Apr. 27, 1943 |
| 2,327,996 | Burnam | Aug. 31, 1943 |
| 2,417,739 | De Groote | Mar. 18, 1947 |